United States Patent
Da Silva et al.

(10) Patent No.: US 11,477,671 B2
(45) Date of Patent: Oct. 18, 2022

(54) METHODS AND ARRANGEMENTS FOR RADIO LINK MEASUREMENT CONFIGURATION

(71) Applicant: Telefonaktiebolaget LM Ericsson (publ), Stockholm (SE)

(72) Inventors: Icaro L. J. Da Silva, Solna (SE); Rui Fan, Beijing (CN); Qingyu Miao, Beijing (CN); Andres Reial, Malmö (SE); Johan Rune, Lidingö (SE); Zhang Zhang, Beijing (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/334,248

(22) PCT Filed: Sep. 30, 2016

(86) PCT No.: PCT/CN2016/101050
§ 371 (c)(1),
(2) Date: Mar. 18, 2019

(87) PCT Pub. No.: WO2018/058513
PCT Pub. Date: Apr. 5, 2018

(65) Prior Publication Data
US 2019/0230536 A1    Jul. 25, 2019

(51) Int. Cl.
*H04W 24/08* (2009.01)
*H04B 7/06* (2006.01)
*H04L 1/00* (2006.01)

(52) U.S. Cl.
CPC .......... *H04W 24/08* (2013.01); *H04B 7/0695* (2013.01); *H04L 1/0026* (2013.01); *H04L 1/0027* (2013.01); *H04L 1/0036* (2013.01)

(58) Field of Classification Search
None
See application file for complete search history.

(56) References Cited

U.S. PATENT DOCUMENTS

| 5,661,724 A | 8/1997 | Chennakeshu |
| 8,219,097 B2 | 7/2012 | Park et al. |
| (Continued) | | |

FOREIGN PATENT DOCUMENTS

| CN | 1878374 A | 12/2006 |
| CN | 101018386 A | 8/2007 |
| (Continued) | | |

OTHER PUBLICATIONS

Ericsson, "Mobility Measurements and Procedures", 3GPP TSG-RAN WG2 #94, Nanjing, P.R. China, May 23, 2016, pp. 1-5, R2-164001, 3GPP.

(Continued)

*Primary Examiner* — Mansour Oveissi
(74) *Attorney, Agent, or Firm* — Coats & Bennett, PLLC

(57) ABSTRACT

The present disclosure relates to methods and arrangements for configuring radio link measurement reporting in a wireless communication system supporting a plurality of radio link reporting mechanisms. Performed in an access node, the method comprises obtaining (S21) a plurality of radio link reporting configurations, each radio link reporting configuration specifying one or more of the supported radio link reporting mechanisms and wherein at least one of the plurality of radio link reporting configurations specifies a combination of a first and a second radio link reporting mechanism being mutually different. The method further comprises selecting (S22) one radio link reporting configuration from the plurality of obtained configurations; and transmitting (S23) information about the selected radio link reporting configuration to a wireless device.

18 Claims, 7 Drawing Sheets

(56) References Cited

U.S. PATENT DOCUMENTS

| | | | |
|---|---|---|---|
| 9,025,564 B2* | 5/2015 | Kim | H04W 36/02 370/331 |
| 9,439,206 B2 | 9/2016 | Hofmann et al. | |
| 10,327,183 B2 | 6/2019 | Reial et al. | |
| 2007/0032237 A1 | 2/2007 | Chang et al. | |
| 2008/0020770 A1 | 1/2008 | Hofmann | |
| 2009/0117896 A1 | 5/2009 | Baldemair et al. | |
| 2009/0168718 A1 | 7/2009 | Wang et al. | |
| 2009/0175179 A1 | 7/2009 | Stewart | |
| 2009/0268707 A1 | 10/2009 | Pani et al. | |
| 2010/0279679 A1 | 11/2010 | Young et al. | |
| 2010/0323631 A1 | 12/2010 | Martin et al. | |
| 2013/0189988 A1 | 7/2013 | Alonso-Rubio et al. | |
| 2013/0201913 A1 | 8/2013 | Niemela | |
| 2014/0073329 A1 | 3/2014 | Kang et al. | |
| 2014/0080484 A1 | 3/2014 | Centonza et al. | |
| 2015/0031379 A1 | 1/2015 | Zhi et al. | |
| 2015/0078325 A1 | 3/2015 | Kishiyama et al. | |
| 2015/0092582 A1 | 4/2015 | Liao et al. | |
| 2015/0382258 A1 | 12/2015 | Schmidt et al. | |
| 2016/0029333 A1 | 1/2016 | Seo et al. | |
| 2016/0037425 A1* | 2/2016 | Van Lieshout | H04W 36/30 370/332 |
| 2016/0150435 A1 | 5/2016 | Baek et al. | |
| 2016/0183159 A1 | 6/2016 | Cui et al. | |
| 2016/0345216 A1 | 11/2016 | Kishiyama et al. | |
| 2016/0381610 A1 | 12/2016 | Pu et al. | |
| 2017/0054479 A1 | 2/2017 | Sang et al. | |
| 2017/0215117 A1 | 7/2017 | Kwon et al. | |
| 2017/0366992 A1 | 12/2017 | Rune et al. | |
| 2018/0198590 A1* | 7/2018 | Lee | H04L 1/1671 |
| 2019/0200320 A1 | 6/2019 | Selvaganapathy et al. | |
| 2019/0215737 A1 | 7/2019 | Reial et al. | |
| 2019/0261230 A1 | 8/2019 | Reial et al. | |
| 2019/0281509 A1 | 9/2019 | Tidestav et al. | |
| 2019/0327629 A1 | 10/2019 | Zhang et al. | |

FOREIGN PATENT DOCUMENTS

| | | |
|---|---|---|
| CN | 101111084 A | 1/2008 |
| CN | 101292446 A | 10/2008 |
| CN | 101296163 A | 10/2008 |
| CN | 101400095 A | 4/2009 |
| CN | 101553020 A | 10/2009 |
| CN | 101617545 A | 12/2009 |
| CN | 102223664 A | 10/2011 |
| CN | 102281577 A | 12/2011 |
| CN | 102369760 A | 3/2012 |
| CN | 102711167 A | 10/2012 |
| CN | 102932835 A | 2/2013 |
| CN | 103220048 A | 7/2013 |
| CN | 103329593 A | 9/2013 |
| CN | 103428758 A | 12/2013 |
| CN | 104469873 A | 3/2015 |
| CN | 104488317 A | 4/2015 |
| CN | 105144614 A | 12/2015 |
| CN | 105228200 A | 1/2016 |
| EP | 2568739 A2 | 3/2013 |
| EP | 2747474 A | 6/2014 |
| WO | 2010148536 A1 | 12/2010 |
| WO | 2014164144 A1 | 10/2014 |
| WO | 2015137782 A1 | 9/2015 |
| WO | 2015164712 A1 | 10/2015 |
| WO | 2016014203 A1 | 1/2016 |
| WO | 2016053426 A1 | 4/2016 |
| WO | 2016129957 A1 | 8/2016 |
| WO | 2016198123 A1 | 12/2016 |
| WO | 2018053748 A1 | 3/2018 |
| WO | 2018058512 A1 | 4/2018 |
| WO | 2018058514 A1 | 4/2018 |
| WO | 2018058515 A1 | 4/2018 |

OTHER PUBLICATIONS

Ericsson, "W1 design for implicit advanced CSI reporting", 3GPP TSG-RAN WG1#86, Gothenburg, Sweden, Aug. 22, 2016, pp. 1-6, R1-167645, 3GPP.

Intel Corporation, et al., "WF on beam management", Agenda item: 8.1.5, 3GPP TSG RAN1 #86, Gothenburg, Sweden, Aug. 22, 2016, pp. 1-2, R1-168119, 3GPP.

3rd Generation Partnership Project, "3rd Generation Partnership Project; Technical Specification Group Radio Access Network; Physical layer; Measurements (FDD) (Release 13)", Technical Specification, 3GPP TS 25.215 V13.0.0, Dec. 1, 2015, pp. 1-25, 3GPP.

ZTE Corporation, Performance Analysis on Early HO Preparation and Early HO CMD, 3GPP TSG-RAN WG2 Meeting #83, Barcelona, Spain, 19th, Aug. 23, Aug. 2013, R2-132375.

* cited by examiner

METHODS AND ARRANGEMENTS FOR RADIO LINK MEASUREMENT CONFIGURATION

TECHNICAL FIELD

The present disclosure relates to methods and arrangements for configuring radio link measurement reporting in a wireless communication system supporting a plurality of radio link reporting mechanisms

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink. In order to support high data rates, LTE allows for a system bandwidth of 20 MHz, or up to 100 MHz when carrier aggregation is employed, and LTE will continue to evolve. In parallel to the LTE evolution, a new generation of cellular technology is being developed, a $5^{th}$ generation system, 5G. One of the tasks for 5G is to improve throughput and capacity compared to LTE. This is in part to be achieved by increasing the sampling rate and bandwidth per carrier. 5G is also including use of higher carrier frequencies i.e., above 6 GHz.

In an UTRAN and an E-UTRAN, a User Equipment, UE, or a wireless device is wirelessly connected to a Radio Base Station, RBS, commonly referred to as a NodeB, NB, in UMTS, and as an evolved NodeB, eNodeB or eNB, in LTE. A Radio Base Station, RBS, access node, AN, or access point, AP, is a general term for a radio network node capable of transmitting radio signals to a UE and receiving signals transmitted by a UE. In Wireless Local Area Network, WLAN, systems the wireless device is also denoted as a Station, STA.

Future communications networks are expected to use advanced antenna systems to a large extent. With such antennas, signals will be transmitted in narrow transmission beams to increase signal strength in some directions, and/or to reduce interference in other directions. The high frequencies and reliance on beamforming makes it challenging to maintain a reliable radio link. A narrow beam can quickly be lost—in particular when combined with poor diffraction properties. Hence, beamforming based high-frequency radio access technologies are more susceptible to sudden changes in link quality or even loss of coverage, which may lead to significant delays and signaling until the wireless device can recover and find coverage again. In LTE downlink reference signals are transmitted by the access nodes. Some of the reference signals are cell specific, which means that these do not depend/change per user but remain same for all the users and entire system, once configured. A user equipment, UE, receiving the reference signal can measure the quality of neighbor cells for mobility purposes. In LTE, some reference signals are broadcasted in an always-on manner and over the full bandwidth, regardless of the presence or position of UEs in the system. These signals are called cell specific reference signals, CRS. Applying the principle of continuous transmission of reference signals in all individual transmission beams in such a future cellular communications network may consume resources available for data, and generate a lot of interference in neighboring cells. Continuous transmissions also cause high energy consumption in the radio access points.

One option for reporting the measurements, also known as mobility reference signal measurements, from the UE back to the NW is to use RRC signaling. The information is aggregated at the L3 level and long report lengths may be supported that allow conveying information about many detected candidate link identities and their estimated signal strengths or qualities. Upon the reception of these measurement reports the network is capable of taking handover decisions, either to keep the UE in the cell, move it to another cell within the same frequency, another frequency and/or RAT. The link switch decision may then be taken by the NW considering a combination of link quality and network status parameters.

However another option for handling radio link with non-RRC reporting is also being investigated based on physical layer, L1-based, reporting using suitable uplink signals, e.g., Uplink Synchronization Sequences, USS, a locally unique signal carrying a synchronization pilot and an identity. Alternatively, the L1-based reporting may use a physical random access channel (PRACH) preamble. The UE may be configured to send the USS to the target to indicate e.g. the best of a set of candidate DL beams through a preconfigured USS sequence. The UE is configured for performing measurements of multiple candidate beams and, upon detecting the strongest beam; it should directly access the node it originates from. This is done by sending an USS whose uplink, UL, resources (Time/Frequency slot, sequence) are associated with the downlink, DL, beam; the association is preconfigured by the network. The receiving AN, e.g. the target AN, reserves UL resources for USS detection ahead of time, which allows the report to be conveyed with minimal latency. Upon receiving a USS report, an AN, e.g. the target AN, may signal in the DL the new serving link to allow sync parameter updates and other possible configuration changes at the UE. This L1-based method is a quicker way to access a target beam in scenarios where the SINR of the serving link can quickly drop due to shadowing and provides for an improvement in terms of robustness and latency, due to the fact that the UE sends the reporting directly to the target while in the RRC-based method the UE needs to send the measurements to the source, wait for a decision from the source and eventually receive an RRC Connection Re-configuration from the serving link which might be under bad radio conditions.

RRC-based measurement reporting allows conveying reliable, rich measurement information from the UE to the network, but often with considerable signaling overhead and potentially high latency. Only using RRC signaling for mobility decisions, as in LTE, may create problems in some scenarios envisioned for the New Radio, NR, in 5G, such as when the UE is using a high gain beamforming in higher frequencies. There, the link quality provided by a beam can drop very quickly due to the aggressive shadowing effect that does not exist in frequencies when LTE is deployed and the narrow coverage of the beam. RRC signaling may therefore be unsuitable in scenarios in beam-formed systems where link quality diminishes rapidly outside the best coverage areas. The alternative approach, based on USS-reporting, may create problems in other scenarios and may entail complexity and resource drawbacks. In USS-based reporting, the UE can convey only a single link report at a time. Consequently, the beam switch or mobility procedure effectively becomes UE-controlled, since the best link detection and reporting from the UE determines the target link.

Accordingly, there is a need to improve measurement reporting in support of mobility procedures.

SUMMARY

An object of the present disclosure is to provide solutions which seek to mitigate, alleviate, or eliminate one or more of the above-identified deficiencies in the art and to provide solutions for improving signaling efficiency and link continuity during mobility procedures.

This object is obtained by a method, for use in an access node, for configuring radio link measurement reporting in a wireless communication system supporting a plurality of radio link reporting mechanisms. The method comprises obtaining a plurality of radio link reporting configurations, each radio link reporting configuration specifying one or more of the supported radio link reporting mechanisms and wherein at least one of the plurality of radio link reporting configurations specifies a combination of a first and a second radio link reporting mechanism being mutually different. One radio link reporting configuration is selected from the plurality of obtained configurations; and information about the selected radio link reporting configuration is transmitted to a wireless device.

The disclosed method provides for link continuity in wireless networks by providing the ability to use different reporting mechanisms depending on different link conditions and network load situation instead of always relying on a single mechanism. The disclosed method may be particularly beneficial in a wireless communication system where link quality diminishes rapidly outside a best coverage area, e.g., in high frequency beam-forming system having narrow beam coverage. According to an aspect of the disclosure, the first and second radio link reporting mechanisms uses signaling on different protocol layers, have different reporting time cycles, or require different amounts of radio resources.

According to an aspect of the disclosure, the first radio link reporting mechanism is a physical layer radio link reporting mechanism.

According to another aspect of the disclosure, the second radio link reporting mechanism is a radio resource control, RRC, reporting mechanism.

By exploiting this configurability, the network can more flexibly play the tradeoff between resource allocation in the uplink, e.g., in terms of uplink synchronization sequences, and mobility robustness. The network would be capable of selecting a radio link reporting configuration based on a determination whether allocation of uplink resources, e.g., USS sequences or physical random access channel, PRACH resources, is motivated from a link continuity perspective.

The above object of the disclosure is also obtained by a computer readable storage medium, having stored thereon a computer program which, when executed in an access node, causes the wireless device to execute any of the above mentioned aspects.

Likewise, the object of the disclosure is obtained by an access node that is configured for configuring radio link measurement reporting in a wireless communication system supporting a plurality of radio link reporting mechanisms. The access node comprises radio circuitry arranged for transmission and reception of radio signals, communications circuitry arranged for transmission and reception of inter node communications signals and processing circuitry. The processing circuitry is configured to, using the radio circuitry, cause the access node to obtaining a plurality of radio link reporting configurations, each radio link reporting configuration specifying one or more of the supported radio link reporting mechanisms and wherein at least one of the plurality of radio link reporting configurations specifies a combination of a first and a second radio link reporting mechanism being mutually different. The processing circuitry is further configured to cause the access node to select one radio link reporting configuration from the plurality of obtained configurations and to transmit information about the selected radio link reporting configuration to a wireless device.

The access node and the computer program enable the corresponding advantages of those described above in relation to the method for use in an access node.

The object to provide solutions for improving signaling efficiency and link continuity during mobility procedures is also obtained by a method for use in a wireless device for configuring radio link measurement reporting in a wireless communication system supporting a plurality of radio link reporting mechanisms. The method comprises obtaining a radio link reporting configuration comprising at least one radio link reporting mechanism, wherein the radio link reporting configuration specifies a combination of a first and a second radio link reporting mechanism being mutually different. The method further comprises performing one or more mobility measurements for corresponding one or more candidate links and transmitting the one or more mobility measurements using the obtained radio link reporting configuration, wherein the mobility measurements are transmitted in a radio link measurement report to one or more access nodes associated with the reporting mechanism.

The above mentioned object of the disclosure is also obtained by a computer readable storage medium, having stored thereon a computer program which, when executed in a wireless device, causes the wireless device to execute any of the above mentioned method aspects.

Likewise, the object of the disclosure is obtained by a wireless device that is configured for configuring radio link measurement reporting in a wireless communication system supporting a plurality of radio link reporting mechanisms. The wireless device comprises radio circuitry arranged for transmission and reception of radio signals. The wireless device further comprises processing circuitry configured to, using the radio circuitry, cause the wireless device to obtain a radio link reporting configuration comprising at least one radio link reporting mechanism, wherein the radio link reporting mechanism specifies a combination of a first and a second radio link reporting mechanism being mutually different. The processing circuitry is further configured to perform one or more mobility measurements for corresponding one or more candidate links and transmit the one or more mobility measurements using the obtained radio link reporting configuration, wherein the mobility measurements are transmitted in a radio link measurement report to one or more access nodes associated with the reporting mechanism.

The method performed in an access node, the computer program and the network node enable the corresponding advantages of those described above in relation to the method performed in a wireless device.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

BRIEF DESCRIPTION OF THE DRAWINGS

The foregoing will be more readily understood from the following detailed description of example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1A:
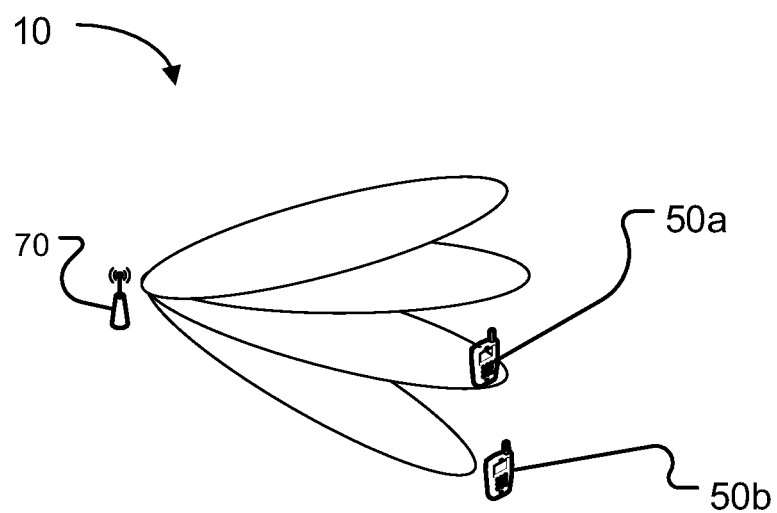
FIG. 1
 a. illustrates a beam sweep transmitted from an access node;
 b. illustrates a measurement report transmission from the wireless device.

Aspects of the present disclosure will be described more fully hereinafter with reference to the accompanying drawings. The methods and arrangements disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

It should be noted that the word "comprising" does not necessarily exclude the presence of other elements or steps than those listed. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments.

In some embodiments the term "access node", AN, is used and it can correspond to any type of access node or any network node, which communicates with a UE and/or with another network node. Examples of access nodes are NodeB, base station, multi-standard radio, radio node, eNodeB, network controller, radio network controller, base station controller, relay, donor node controlling relay, base transceiver station, access point, transmission points, transmission nodes, nodes in distributed antenna system, DAS etc.

Within the context of this disclosure, the terms "wireless device" or "wireless terminal" encompass any terminal which is able to communicate wirelessly with an access node of a wireless network, as well as, optionally, with another wireless device, by transmitting and/or receiving wireless signals. Thus, the term "wireless device" encompasses, but is not limited to: a user equipment, e.g. an LTE UE, a mobile terminal, a stationary or mobile wireless device for machine-to-machine communication, an integrated or embedded wireless card, an externally plugged in wireless card, a dongle etc. Throughout this disclosure, the term "user equipment" is sometimes used to exemplify various embodiments. However, this should not be construed as limiting, as the concepts illustrated herein are equally applicable to other wireless devices. Hence, whenever a "user equipment" or "UE" is referred to in this disclosure, this should be understood as encompassing any wireless device as defined above.

In support for higher frequencies in Next Generation, NG, communication systems, beamforming is an essential component. Using antenna arrays at access nodes with the number of elements in the hundreds, fairly regular grid-of-beams coverage patterns with tens or hundreds of candidate beams per node may be created. The coverage area of an individual beam from such an array may be small, down to the order of some tens of meters in width. Channel quality degradation outside the current serving beam area may be significant and occur quickly due to the limited coverage area of the beam.

As a consequence, mobility procedures in NG also need to address the problem of finding candidate beams and not only a target AN. Beam sweep procedures are typically employed whereby different beams, i.e., different reference signals used for synchronization and mobility, is sequentially transmitted in a plurality of beam directions from an AN. FIG. 1a illustrates a beam sweep transmitted from an AN having one transmission point. Such a beam sweeping procedure with the purpose of synchronization and beam finding may be performed in conjunction with handover of a wireless device from one beam to another. A handover preparation procedure involving beam sweeping may involve candidate target beams from the wireless device's current serving access node and/or one or more other candidate target access nodes. In NG systems it is also expected that one single access node might have several transmission points.

Different measurement reporting mechanisms are being investigated for the beam quality reporting: RRC based reporting and a PHY-layer based reporting using Uplink Synchronization Sequences, USS, or physical random access channel, PRACH, preamble, where a UE is configured to send the USS to the target node to indicate e.g. the best of a set of candidate DL beams through a preconfigured USS, or PRACH preamble, sequence.

In RRC-based reporting, the UE is configured to measure so-called mobility reference signals and, upon the triggering of certain pre-configured events, e.g., serving beam lower than a first threshold while neighbor beam is higher than a second threshold, the UE sends an RRC measurement report message comprising comprehensive, reliable measurement information to a serving source AN, or AN-s, via an established RRC Connection. Based on that, the AN, or more specifically the network function managing mobility, can take educated mobility decisions since the report message will contain radio measurements with respect to multiple candidate nodes or beams associated to a certain UE at certain point in time.

Figure 1B:
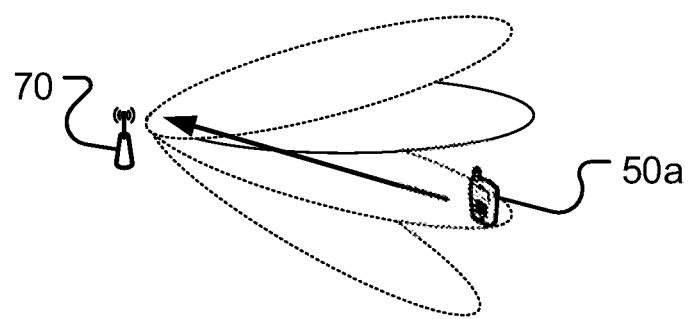

In USS-based reporting the UE is configured to measure mobility reference signals of multiple candidate beams and, to send as a measurement report, an USS whose uplink, UL, resources, e.g., T/F slot and sequence, are associated with a downlink, DL, beam. FIG. 1b illustrates a wireless device reporting one beam of the beam sweep of FIG. 1a. The USS-based reporting presents a quicker way to access a target beam in scenarios where the SINR of the serving link can quickly drop due to shadowing, to counteract the propagation challenges in a beam-based system. In terms of robustness and latency, there is an improvement compared to the RRC-based method due to the fact that the UE sends the reporting directly to the target access node, while in the RRC-based method the UE needs to send the measurements to the source access node, wait for a decision from the source and eventually receive a mobility command, e.g., an RRC Connection Re-configuration message, on the serving link which might be under bad radio conditions.

RRC-based measurement reporting allows conveying reliable, rich measurement information from the UE to the network, but often with considerable signaling overhead and potentially high latency. In USS-based reporting, the UE can convey only a single link report at a time. Consequently, the beam switch or mobility procedure effectively becomes UE-controlled and may be less reliable than the RRC-based procedure. Thus, using RRC signaling for mobility decisions entails problems in some NG scenarios, but the alternative approach may also be problematic in other NG scenarios.

The methods and arrangements presented in this disclosure take advantage of the benefits offered by different reporting mechanisms, such as RRC-based reporting and USS-based reporting, whilst reducing the associated drawbacks. The idea is to configure a wireless device to trigger a specific reporting mechanism or combination of reporting mechanisms for mobility related reporting.

The disclosed solutions are particularly beneficial in wireless networks employing high-gain beamforming, where the candidate links are the different beam configurations that would be used for communication with the wireless device, as illustrated in FIG. 1a. However, the principles are also equally applicable to more traditional, cell- and sector-based deployments. Furthermore, in the disclosure, the terms 'links' and 'beams' are used interchangeably and when referring to a beam this represents one example of a link.

Figure 2:
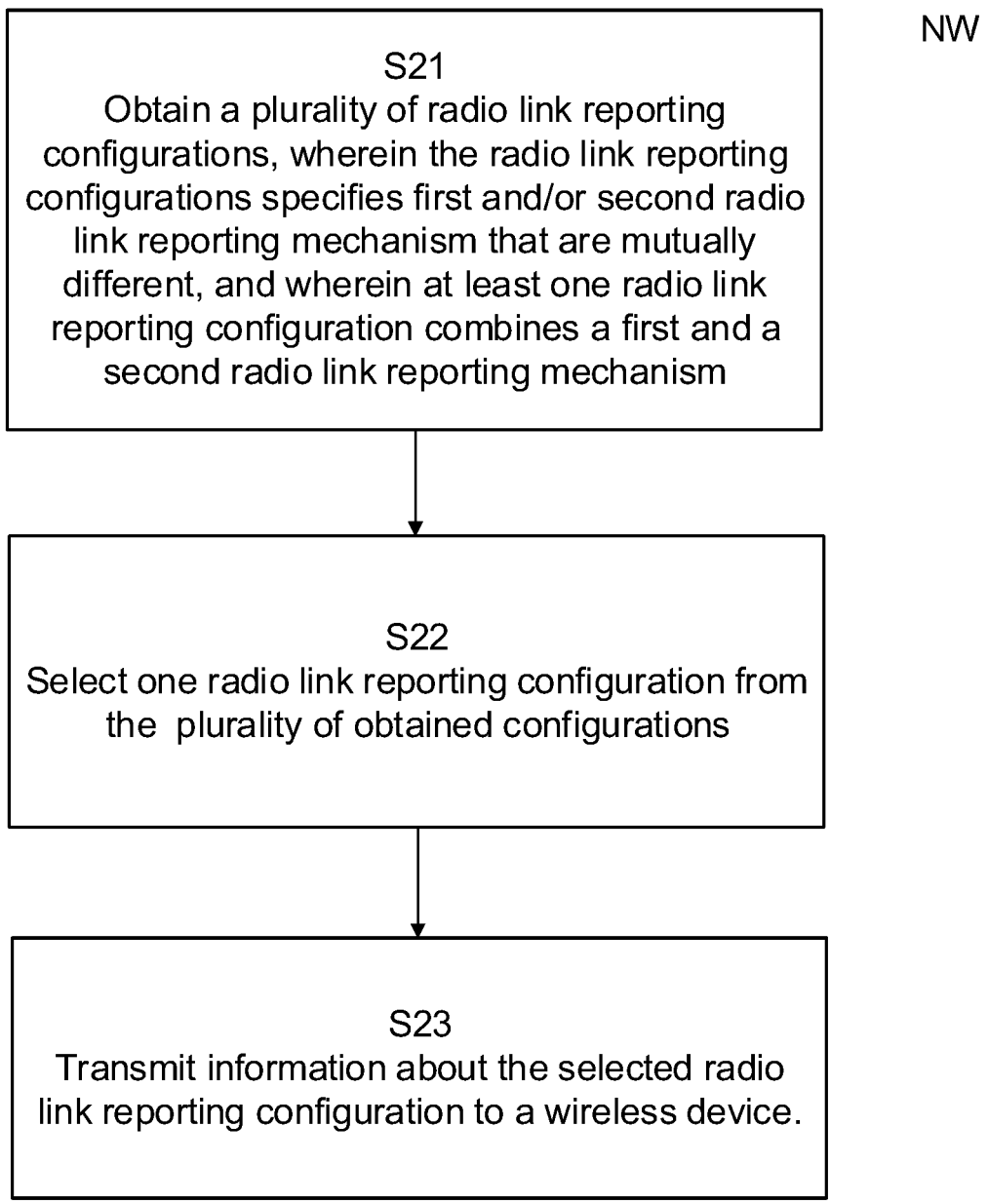
FIG. 2 is a flowchart illustrating exemplary method steps performed in an access node.

FIG. 2 illustrates, in a flowchart, exemplary operations performed in a network node of a wireless communication network. The disclosed method provides a solution for configuring radio link measurement reporting in a wireless communication system supporting a plurality of radio link reporting mechanisms. In its most general form, the disclosure presents a method where the network configures a wireless device to trigger a specific reporting configuration. The network, represented by the access node providing a radio interface to the wireless device, obtains S21 a plurality of radio link reporting configurations, each radio link reporting configuration specifying one or more of the supported radio link reporting mechanisms and wherein at least one of the plurality of radio link reporting configurations specifies a combination of a first and a second radio link reporting mechanism being mutually different. A radio link reporting configuration is either a specific reporting mechanism and/or a combination of mechanisms providing different kinds of quality related information about candidate radio links. The radio link configuration may also comprise a set of criteria defining when and how a certain radio link configuration should use the specified combination of mutually different reporting mechanisms.

According to aspects of the disclosure, types of reporting mechanism considered for such radio link reporting configurations are first and second radio link reporting mechanisms using signaling on different protocol layers, e.g., a physical radio link reporting mechanisms such as reporting in an uplink synchronization signal, USS, and an RRC-based reporting mechanism. Other types of first and second radio link reporting mechanisms having different reporting time cycle or requiring different amount of radio resources. In the following disclosure, the following radio link measurement configurations will be further considered and discussed:

(1) Only RRC measurement reports to a serving access node;
(2) only USS-based beam quality reports to candidate target access node;
(3) either RRC measurement reports to a serving access node or USS based beam quality reports to candidate target access node;
(4) USS-based beam quality reports to candidate target access node in addition, "as an extension", to RRC Measurement reports to serving access nodes
(5) USS-based beam quality reports to candidate target access node "as a back-up" to RRC Measurement reports to serving access nodes; and
(6) RRC measurement reports to serving access nodes in addition, "as an extension", of USS-based beam quality reports to candidate target access nodes.

The radio link reporting mechanisms of a radio link reporting configuration may be configured to either report to a serving access node or to a target access node or to both the serving and target access nodes, where the mechanisms will vary depending on which access node that receives the report.

According to an aspect of the disclosure, a radio link reporting configuration is adapted to a reporting type, and wherein the reporting types comprise periodic reporting, on demand reporting or event-triggered reporting. Thus, use of a radio link reporting mechanism in a radio link reporting configurations may be initiated or concluded based on a triggering condition to start or to stop a given reporting mechanism and associated with a start and/or stop trigger condition determining when to perform radio link measurements using the radio link reporting configuration. Triggering conditions may also exist to switch from one reporting mechanism to another. The various triggering conditions can be conveyed via a configuration message to the wireless device.

The access node selects S22 one radio link reporting configuration from the plurality of obtained configurations and transmits S23 information about the selected radio link reporting configuration to a wireless device. Thus, the selection and transmission of the radio link reporting configuration implies configuring the wireless device for the measurements.

The wireless device can be configured for the selected radio link reporting configuration in different ways, depending on the way the network wants to use the different reporting mechanisms. In the case where the radio link reporting configuration is used on a per-UE basis, RRC dedicated signaling can be used to configure the wireless devices such as when the wireless device establishes or re-establishes an RRC Connection. Configuration of an individual wireless device may also occur when the wireless device is coming from a dormant or sleeping state, e.g., Inactive, and performs an RRC Resume procedure. In both cases an RRCConnectionReconfiguration can be used to configure the wireless devices for the measurements. If the network instead determines that all wireless devices in a given area are to use similar reporting mechanisms and consequently the similar radio link reporting configurations, e.g., due to some network capabilities and/or resource situation, the access node can provide information about the selected radio link reporting configuration via system information that is broadcasted or transmitted to the group of wireless devices.

The herein disclosed method is also applicable to wireless communication networks wherein LTE and New Radio, NR, co-exist with overlapping and non-overlapping coverage. For the case where the wireless device is connected to LTE, i.e., holds an RRC Connection with an LTE eNB with NR beams/cells as neighbor candidates and is configured to measure and send quality reports using one or multiple of the proposed radio link reporting configurations, the wireless device can be configured over LTE RRC Connection to perform the RRC reporting over LTE, USS reporting over NR or combine the reporting mechanisms, as briefly mentioned above.

The selected radio link reporting configuration and details relating this configuration, e.g., triggering conditions, thresholds, etc., can be conveyed as part of an RRCConnectionReconfiguration message as part of the Measure Report configuration IE (measConfig), typically transmitted when the wireless device sets up an RRC Connection and/or when the wireless device is coming back from an inactive state e.g. RRC Idle and or a new state optimized for data inactivity such as RRC Connected Inactive and/or Suspend/Resume.

According to an aspect of the disclosure, the selected radio link reporting configuration can be associated to a reporting type and a reporting format:
  Reporting type: reports can be configured to be i) periodic, ii) based on a specific "on demand" command or iii) based on the triggering of certain pre-configured events; and
  reporting format: the quantities that the wireless device includes in the measurement report and associated information (e.g. number of cells/beams to report).

Using the RRCConnectionReconfiguration message to convey information on the selected radio link reporting mechanism, two additional information elements, IEs, should be included to specify the the reporting type and the reporting format associated to the radio link reporting configuration.

Periodic Reporting

For any of the proposed radio link reporting configurations the UE can be configured to send periodic reports. In the case of radio link reporting configurations one specified radio link reporting mechanism, e.g., radio link reporting configuration (1)-(3) presented above, the network can configure the UE with "periods" in terms of milliseconds, seconds or any time measure. When the wireless device detects a downlink signal applicable for mobility measurements, e.g., a Mobility Reference Signal, MRS, the wireless device will start to send periodic measurement reports. The configuration may also contain a stop criterion such as a timer or number of reports to be transmitted. In the case the network configures the wireless device with a combined radio link reporting configurations, e.g., radio link reporting configuration (4)-(6) presented above, two different report periods T1 and T2 may be determined, i.e. one for the RRC reports and another for the USS reports.

Reporting Based on a Specific "on Demand" Command

The proposed radio link reporting configurations can be used in conjunction with on-demand beam sweeps (i.e. a single sweep of candidate beams activated on demand). To leverage the respective advantages of the different radio link reporting configurations, the measurement reporting means may be configured to depend on conditions, even though the reporting as such is not event based.

In addition, the choice of radio link reporting configuration(s) to configure may depend on conditions in the network.

The following are advantageous ways of flexibly using the advantages of the respective radio link reporting configurations in conjunction with measurement on an on-demand beam sweep:
  Configure RRC reporting as default, but use USS reporting instead if the serving link/beam is lost;
  configure RRC reporting as default, but use USS reporting in addition, if the serving link/beam quality is below a certain threshold;
  configure USS reporting as default, but use RRC reporting if no response is received after transmitting the USS;
  configure the wireless device to use USS reporting if the best beam is at least a certain offset better than the second best beam (including the serving beam); otherwise use RRC based reporting;
  configure RRC reporting when the load in one or more of the candidate access node is high;
  configure USS reporting when the load is low or moderate in all candidate access nodes.

Event-Triggered Reporting

The wireless device can be configured by the network to trigger one of the radio link reporting configurations based on mobility events where some associated triggering conditions are also configured, associated with each reporting mechanism. According to aspects of the disclosure, a radio link reporting configuration adapted to an event triggered reporting is associated with a start trigger condition determining when to perform radio link measurements using the radio link reporting configuration and/or stop trigger condition determining when to cease radio link measurements using the radio link reporting configuration. The start and/or stop trigger condition may be configured for a mobility event as will be discussed more in detail below.

If a given mobility event is fulfilled for one or more candidate links for all measurements, the UE shall initiate the measurement reporting procedure. Upon the fulfillment of their entering conditions the UE should start sending or stop sending USS-based quality report(s) via a pre-configured UL channel or RRC-based Measurement reports to the serving AN. The following mobility events can be configured at the UE for any of the four types of radio link reporting configurations (3)-(6) mentioned above:
  Event A1e: Serving link quality becomes better than threshold(s)
  Event A2e: Serving link quality becomes worse than threshold(s)
  Event A3e: Neighbor link quality becomes offset better than serving beam(s)
  Event A4e: Neighbor link quality becomes better than threshold
  Event A5e: PCell/PSCell* becomes worse than threshold1 and neighbor becomes better than threhsold2
  Event A6e: Neighbor link quality becomes offset better than SCell
  Event B1e: Inter-RAT neighbor link quality becomes better than threshold
  Event B2e: PCell becomes worse than threshold1 and inter RAT neighbor becomes better than threshold2

Event C1e (CSI-RS resource becomes better than threshold)

Event C2e (CSI-RS resource becomes offset better than reference CSI-RS resource)

In the section below an example presentation on how a wireless device considers the entering and leaving conditions for events A1, A2 and A3. Entering and/or leaving conditions may also be established for other events presented above and the disclosure is not limited to the herein below presented conditions and how the wireless device considers these.

Event A1 (Serving Beam Becomes Better than Threshold)

The UE shall consider the entering and leaving condition for this event to be satisfied when $Ms-Hys>\text{Thresh}$ (entering condition)

$Ms+Hys>\text{Thresh}$ (leaving condition)

In these inequalities Ms is the measurement result associated to serving beam(s), not taking into account any offsets. That measure can either be the average quality of a single beam over time (and/or a certain number of samples and/or MRS measurement periods) or any sort of average (linear average, moving average, etc.) quality measured among multiple serving beams e.g. in the case the UE is in multi-connectivity. In that particular case of multi-connectivity Ms can also be associated to the strongest serving beam the UE is connected to or the weakest.

Hys is the hysteresis parameter for this event.

Note about X1: Since this indicates the recovery of the connection the triggering of this event will be associated with the stop of one of our reporting mechanisms.

Event A2 (Serving Becomes Worse than Threshold)

The UE shall consider the entering and leaving condition for this event to be satisfied when $Ms+Hys<\text{Thresh}$ (entering condition)

$Ms-Hys>\text{Thresh}$ (leaving condition)

Note about X2: Since this indicates that the quality of the connection is dropping the triggering of this event will be associated with the triggering on our reporting mechanisms (RRC-based and/or USS based).

Event A3 (Neighbor Beam Becomes Offset Better than Serving Beam)

The UE shall consider the entering and leaving condition for this event to be satisfied when:

Note about X3: Since this indicates that the quality of the connection is dropping relatively to the neighbor beam the triggering of this event will be associated with the triggering on our reporting mechanisms although depending on the thresholds the timing might not be so critical.

$Mn+Ofn+Ocn-Hys>Ms+Ofp+Ocp+Off$ (entering condition)

$Mn+Ofn+Ocn+Hys<Ms+Ofp+Ocp+Off$ (leaving condition)

Mn is the measurement result of the neighboring beam(s), not taking into account any offsets. That can be the absolute value of a neighbor beam or an average quality taken from multiple beams e.g. associated with a given AN (informed by the serving AN and/or explicitly signaled in the MRSs)

Ofn is the frequency specific offset of the frequency of the neighbor beam

Ocn is the beam specific offset of the neighbor beam, and set to zero if not configured for the neighbour beam.

Mp is the measurement result of the serving beam, not taking into account any offsets.

Ofp is the frequency specific offset of the frequency of the serving beam

Ocp is the beam specific offset of the serving beam, and is set to zero if not configured for the serving beam.

Hys is the hysteresis parameter for this event

Off is the offset parameter for this event

The notion of PCell/PSCell* can also be extended to also cover the concept of a beam or an active set of beams. In other words, one could define a PCell or SCell as a set of beams. In the context of the previously defined events the terms Serving link and Neighbor link may refer to the following:

Single cell

Single beam and/or

Group of beams.

In the third case i.e. when the configuration refers to a group of beams (either for the serving or neighbor) the network can configure the UE to trigger one of the previously defined events based on different metrics associated to this group of beams such as:

Average quality (e.g. RSRP and/or RSRQ) of multiple beams detected or a subset of them;

Weighted average quality where the quality of the strongest beam had a higher value;

Quality of the strongest beam;

Quality of the N strongest beams.

That can be useful for example in the case multiple neighbor beams are associated to a given neighbor cell and/or access node and/or transmission point so that an event is only triggered when a representative metric for the overall cell is below a certain threshold rather than triggering the measurement reports due to the bad quality of a very specific beam that might later not be detectable by the UE e.g. due to UE movement once the network takes a mobility decision. One can also consider that the UE is configured with a set of Mobility Reference Signals (MRSs) associated to its source/serving access node so that in the previously defined events the quality of neighbor beams are compared with an overall serving/source quality.

In the case this notion of group of beams is associated to radio link reporting configurations where RRC reports are configured i.e. radio link reporting configuration 1), 3) or 6), the configuration from the network may further contain information saying whether the UE should report the aggregated metrics, the measurements per beam and/or both kinds of measurements. In other words, the events can be triggered based on group statistics but reports could be more detailed e.g. measurements per beam.

Event-Triggered Reporting: An Alternative

Another way to model the usage of USS-based and RRC-based reporting in conjunction is to define the mobility events previously described i.e. A1e, A2e, . . . , C2e and in addition to the previously defined IEs define a notion of primary and secondary events where the latter are sort of conditional events to the first one(s).

In order to realize the case where USS reporting to target AN "as an extension" of RRC reporting to serving AN which was in the previous solution modelled as a separate mobility event (4), the wireless device can be configured with a primary mobility event are associated to RRC Measurement Reports while the secondary event, conditional to the primary event, are transmitted to target AN(s) using USS. The event types as described earlier (A1e, A2e, . . . , C2e) can be the same for the different mechanisms but with different thresholds and radio link reporting configurations i.e. one can define an RRC radio link reporting configuration for event A1e and define it as primary and as its secondary define an USS radio link reporting configuration for event A2e. When the wireless device fulfills the conditions for the first event and starts to send RRC measurement reports, it triggers the monitoring of the conditions for its secondary events and, upon the fulfillment of these conditions, the wireless device sends a USS report to the candidate AN that fulfills the conditions according to what has been described earlier for USS-based configurations. The same principle applies for the other events.

Although it is said that the USS report is transmitted to the target or candidate target the signal may also be detected by the source so that the source is capable of taking further mobility and/or beam management decisions.

In that kind of configuration, when the events that stops the RRC reports are triggered (e.g. that the primary mobility event definition is no longer met), the UE stops transmitting via the RRC connections and also stops potential USS transmissions that could be ongoing.

Another configuration that could be seen as USS reporting to the target AN "as an extension" of RRC reporting to the serving AN is that the wireless device is configured to report via RRC to the serving AN as the default means of reporting, but if the link/beam to the serving AN is lost or its quality deteriorates below a certain threshold, then USS reporting to the target AN should be used. Loss of the serving link/beam or quality deterioration of the serving link/beam below a certain threshold could then be seen as the secondary event.

In the case of RRC reporting to serving AN "as an extension" of USS-based report to target AN, in a given configuration informed to the wireless device, the primary mobility events are associated to USS based reports to the target ANs while the secondary events, conditional to the primary events, are transmitted to serving AN(s)/link where the UE holds an RRC connection. The event types as described earlier (A1, A2, . . . , C2) can be the same for the different mechanisms (i.e. for the primary and secondary events) but with different thresholds. When the UE fulfills the conditions for the first event and starts to send USS reports, the wireless device starts to monitor the conditions for the secondary events and, upon the fulfillment of these conditions, the wireless device sends an RRC measurement report to the serving AN.

In that kind of configuration, when the events that stops the USS reports are triggered (e.g. that the primary mobility event definition is no longer met), the UE stops to transmit the USS reports and also stops potential RRC measurement reports that could be ongoing.

The RRC measurement reports contain the measurements that triggered the event. These can be used by the AN to take further actions e.g. send the UE some mobility command and/or multi-connectivity command so the wireless device can contact a given neighbor beam. The measurements can also be informed per beam and or any other configured information by the network e.g. an average of beam quality associated with a given set of beams from the same neighbor AN.

Different measurement reporting configurations can be configured for different wireless devices. When the wireless device moves from one AN to another AN, it can be reconfigured or kept the same. If it is kept, the configuration information should be exchanged from the source AN to the target AN or the candidate ANs.

According to another aspect of the disclosure, the proposed selection of radio link reporting configuration may be applicable to two different procedures: beam sweep and beam refinement. For the two procedures, different radio link reporting configuration may be selected for the respective procedures.

Turning back to the network selecting S22 of a radio link reporting configuration, this is possible taking one or more wireless device related aspects into considerations.

According to a first aspect of the disclosure a radio link reporting configuration is selected based on the frequency bands that the wireless device is configured to measure on and/or the speed of the wireless device. For the above presented radio link reporting configurations, the following selection rules may apply for the respective radio link reporting configuration:

(1) Only RRC measurement reports to a serving access node. This reporting configuration is selected when the frequency deployed is at a lower band and the wireless device speed is low. The network may know that in some areas wireless devices always move with low speed so that it applies the method per area/cell/group of access node or any other notion of geographic area (2) Only USS-based beam quality reports to candidate target access node. This reporting configuration is selected when the frequency deployed is at a higher frequency band (where risk of quick SINR drops occur more often), and/or wireless device speed is more likely to be high.

(3) Either RRC measurement reports to a serving access node or USS based beam quality reports to candidate target access node. This reporting configuration is selected when frequency deployed is at a lower band, but wireless device speed is high, or frequency deployed is at a higher band, but wireless device speed is low.

(4) USS-based beam quality reports to candidate target access node in addition, "as an extension", to RRC Measurement reports to serving access nodes. This reporting configuration is selected when frequency deployed is at a lower band, but wireless device speed is high, or frequency deployed is at a higher band, but wireless device speed is low.

(5) USS-based beam quality reports to candidate target access node "as a back up" to RRC Measurement reports to serving access nodes. This reporting configuration is selected when frequency deployed is at a lower band, but wireless device speed is high, or frequency deployed is at a higher band, but wireless device speed is low.

(6) RRC measurement reports to serving access nodes in addition, "as an extension", of USS-based beam quality reports to candidate target access nodes. This reporting configuration is selected when frequency deployed is at a lower band, but wireless device speed is high, or frequency deployed is at a higher band, but wireless device speed is low.

For the selection purely based on network implementation the network can assume the wireless device specific knowledge about its speed (e.g. sensors are always static) or constantly estimate it. Another possibility is to give some degrees of freedom for wireless devices to measure their own speed so that the wireless device may trigger an event associated to a method based on a speed threshold. In that case some standard support should be provided.

According to another aspect of the disclosure, the network configures its wireless devices with events. Radio link reporting configuration 1 is selected for candidate target MRSs when all the candidate nodes do not acknowledge the request from serving node to reserve resources for USS reception i.e. USS sequences and UL channels associated to it. Radio link reporting configuration 1 is selected when all the candidate nodes acknowledge the request from serving node to reserve resources for USS reception. Radio link reporting configuration 3, 4, 5 or 6 is selected when part of the neighbor nodes acknowledge the request from serving node to reserve resources for USS reception According to another aspect of the disclosure, the network selects the method based on network deployment. The network can select radio link reporting configuration 2 or method when the network knows that the wireless device may likely switch from macro to pico. This is because when switch from macro to pico, the UL quality to the target pico already becomes very good, therefore USS as the basic method (with optional RRC reporting as complement) is advisable.

Radio link reporting configuration 1 or 4 is selected when the network knows UE is going to switch from pico to macro. When switching from pico to macro, the UL quality to the target macro is usually still worse than that to the serving pico, therefore RRC as the basic method (with optional USS reporting as complement) is advisable.

Radio link reporting configuration 3 is selected when the system is highly irregular, e.g. there are macro, micro and pico, what kind of report to adopt depends on the type of target when leaves micro, i.e. whether it is a micro to macro switch (which is similar to pico to macro switch) or micro to pico switch (which is similar to macro to pico switch).

Figure 3:
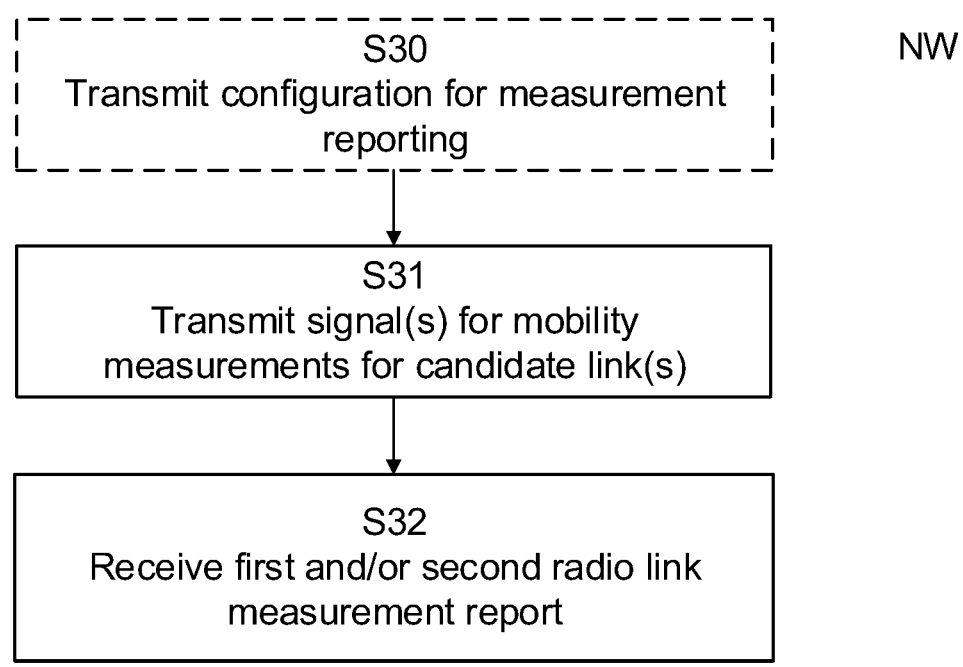
FIG. 3 is a flowchart illustrating network aspects of exemplary method steps.

Turning to FIG. 3, a simplified overview of network operations benefitting from the above presented radio link reporting configuration selection is given. The network transmits S31 one or more mobility reference signals for corresponding candidate radio links and receives first and or second radio link measurement report based on the radio link reporting configuration. As explained in the previous sections, a first radio link measurement report could be provided in a uplink synchronization signal to a receiving access node, e.g., a target access node, while a second radio link measurement report could be provided in an RRC message, e.g., to a source access node. According to an aspect of the disclosure, the network transmits the configuration of the measuring reporting, e.g., comprising a selected radio link reporting configuration.

Figure 4:
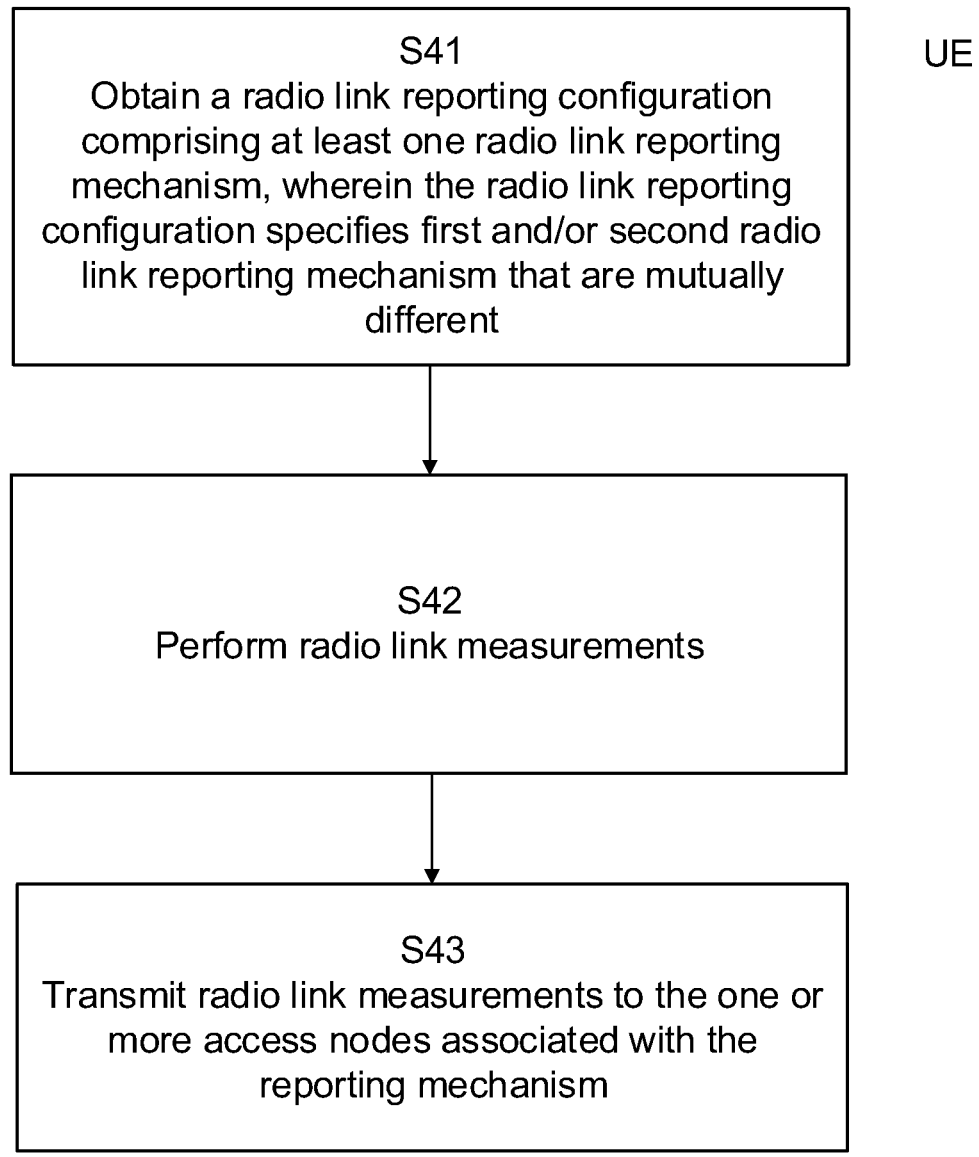
FIG. 4 is a flowchart illustrating exemplary method steps performed in a wireless device.

With the above comprehensive disclosure of network aspects for configuring radio link measurement reporting in a wireless communication system supporting a plurality of radio link reporting mechanisms, we now turn to FIG. 4 and the corresponding wireless device aspects. The wireless device obtains S41 a radio link reporting configuration comprising at least one radio link reporting mechanism, wherein the radio link reporting configuration specifies a combination of a first and a second radio link reporting mechanism being mutually different. As discussed above, the network will transmit information about a selected radio link reporting configuration to a receiving wireless device. However, information on available radio link reporting configurations may also be pre-stored in the wireless device, so that the actual configuration details are not provided in the selection message from the network, but instead only a reference to a predefined type of reporting configuration.

The wireless device is configured to perform S42 one or more mobility measurements for corresponding one or more candidate radio links. According to an aspect of the disclosure, the performing of one or more mobility measurements comprises measuring downlink mobility reference signals, MRS, for corresponding candidate radio links. The wireless device is configured for such MRS measurements and reporting, either ahead of time or immediately before the measurements, e.g., through receiving a configuration from a serving access node. The serving access node will in the following be denominated as a source access node, i.e., the access node to which the wireless device is connected when a mobility procedure is initiated. In general, the wireless device measures the mobility reference signals of multiple candidate links, i.e., mobility measurements for corresponding candidate links. According to an aspect of the disclosure, the wireless device derives downlink, DL, synchronization settings from the downlink mobility reference signals and stores these DL synchronization settings for the candidate radio links, i.e., with respect to all detected candidate links. The mobility reference signals may consist of synchronization sequences to obtain time and frequency (t/f) alignment with respect to candidate link signals and link identification sequences to distinguish the different detected candidate link identities. The mobility reference signals may be used to trigger measurement reports as discussed more in detail above.

The wireless device transmits S43 the one or more mobility measurements using the obtained radio link reporting configuration, wherein the mobility measurements are transmitted in first or second radio link measurement reports to one or more access nodes associated with the reporting mechanism. According to an aspect of the disclosure, the first radio link reporting mechanism is a physical layer radio link reporting mechanism, e.g., using an uplink synchronization sequence, USS, whose parameters (sequence, t/f resources) map to a best-quality link identity according to a previous configuration. Thus, according to an aspect of the disclosure, an uplink synchronization sequence, USS, provides the physical layer radio reporting mechanism, e.g., to a target access node. According to another aspect of the disclosure, the second radio link reporting mechanism is a radio resource control, RRC, reporting mechanism. When a radio link reporting configuration has been selected where a combination of a first and second radio link reporting mechanism is used, the same mobility measurements may be used for both reporting mechanisms.

Figure 5:
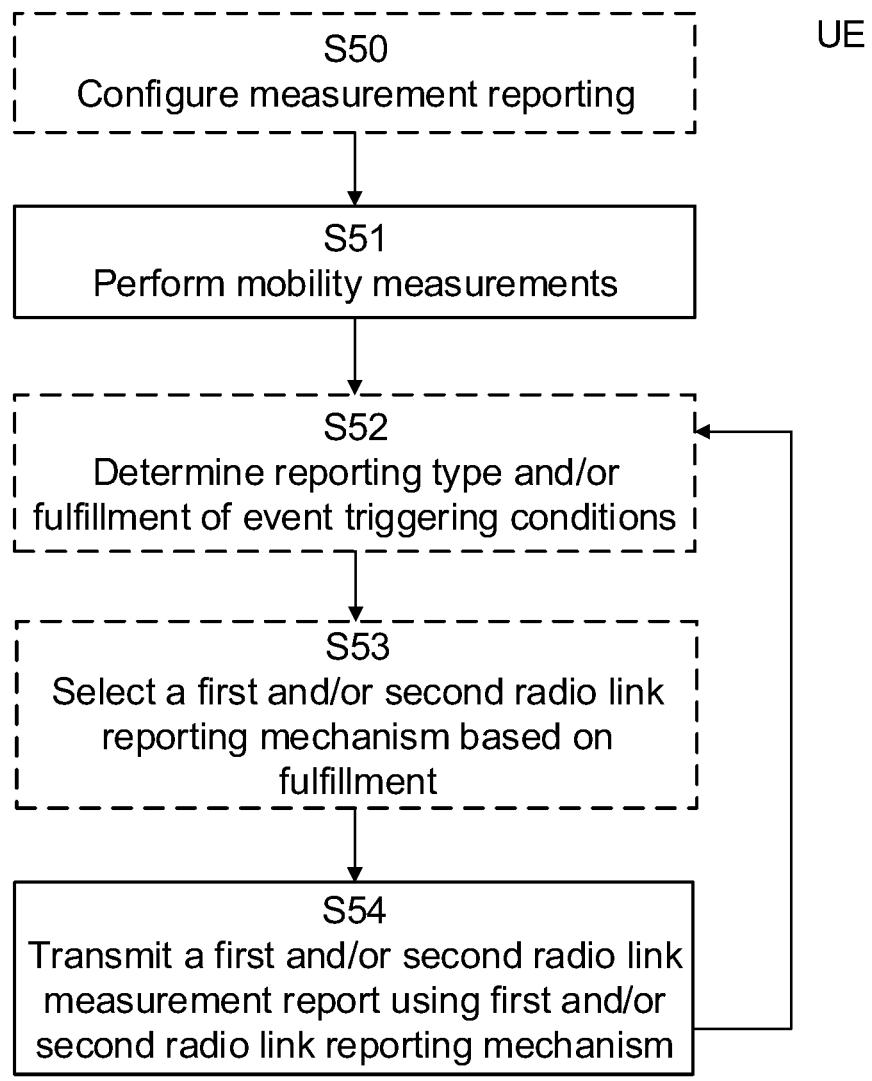
FIG. 5 is a flowchart illustrating method steps performed by a wireless device during radio link measurement reporting.

Turning to FIG. 5, a simplified overview of wireless device operations in a wireless communication system where measurement reporting may be performed according to a plurality of radio link reporting configurations that support a plurality of radio link reporting mechanisms. The wireless device performs S51 one or more mobility measurements for corresponding candidate radio links as discussed above. According to an aspect of the disclosure, the performing of one or more mobility measurements comprises measuring downlink mobility reference signals, MRS, for corresponding candidate radio links. The wireless device is configured for such MRS measurements and reporting, either ahead of time or immediately before the measurements, e.g., through receiving S30 a configuration from a serving access node. It is understood that the wireless device presented in FIG. 5 has obtained at least one radio link reporting configuration and that the network has selected a radio link reporting configuration for the wireless device. As presented above triggering conditions may have been defined by the network to advice the wireless device on when to start or stop a first and/or a second radio link reporting mechanism. According to an aspect of the disclosure, the wireless device determines S52 reporting type and/or fulfillment of event triggering conditions and then selects S53 a first and/or second radio link reporting mechanism based on the fulfillment of the event triggering conditions. According to an aspect of the disclosure each radio link reporting configuration is adapted to reporting type, and wherein reporting types comprise periodic reporting, on demand reporting or event-triggered reporting. According to a further aspect of the disclosure a radio link reporting configuration adapted to an event triggered reporting is associated with a start trigger condition determining when to perform radio link measurements using the radio link reporting configuration and or a stop triggering condition determining when to cease radio link measurements using the radio link reporting configuration. According to a further aspect of the disclosure, the start and/or stop trigger condition is received in a configuration message from an access node and the wireless device configures S50 the measurement reporting taking these conditions into consideration. The wireless device transmits S54 a first and/or second radio link measurement report using first and/or second radio link reporting mechanisms as defined for the obtained radio link reporting mechanism.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed in FIGS. 3, 4, 4*a* and 4*b*. The particular sequence of such executable instructions or associated data structures represents examples of corresponding acts for implementing the functions described in such steps or processes.

Figure 6:
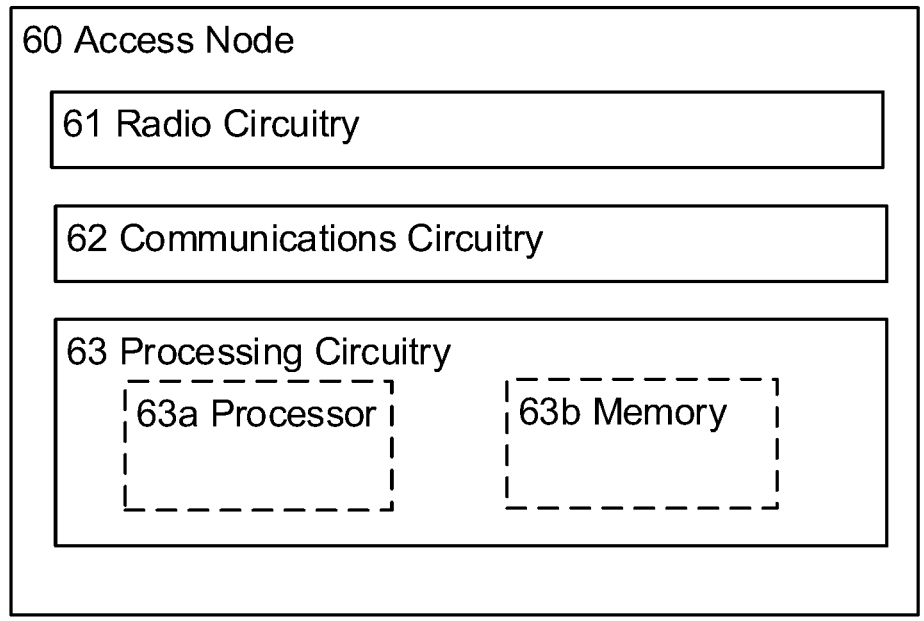
FIG. 6 illustrates an example node configuration for an access node.

FIG. 6 is an example configuration of an access node access node 60, which may incorporate some of the example embodiments discussed above. The access node 60 is configured for configuring radio link measurement reporting in a wireless communication system supporting a plurality of radio link reporting mechanisms. As shown in FIG. 6, the access node comprises radio circuitry 61 arranged for transmission and reception of radio signals. It should be appreciated that the radio circuitry 61 may be comprised as any number of transceiving, receiving, and/or transmitting units or circuitry and that the radio circuitry may operate in half-duplex or full duplex transmission mode. It should further be appreciated that the radio circuitry 61 may be in the form of any input/output communications port known in the art.

The access node may further comprise communications circuitry 62 arranged to transmit and/or receive communications signals from one or more further radio network nodes. It should further be appreciated that the communications circuitry 62 may be in the form of any input/output communications port known in the art.

The access node further comprises processing circuitry arranged to control operation of the access node. In particular, the processing circuitry 63 is configured to cause the access node to obtain a plurality of radio link reporting configurations, each radio link reporting configuration specifying one or more of the supported radio link reporting mechanisms and wherein at least one of the plurality of radio link reporting configurations specifies a combination of a first and a second radio link reporting mechanism being mutually different. The processing circuitry is further configured to cause the access node to select one radio link reporting configuration from the plurality of obtained configurations and transmit information about the selected radio link reporting configuration to a wireless device.

According to an aspect of the disclosure, the processing circuitry comprises a processor 63*a* and a memory 63*b*. The processor 63*a* may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit but may be provided as any number of units or circuitry.

The memory 63*b* may further be configured to store received or transmitted data and/or executable program instructions. The memory 63*b* may be any suitable type of computer readable memory and may be of volatile and/or non-volatile type.

Figure 7:
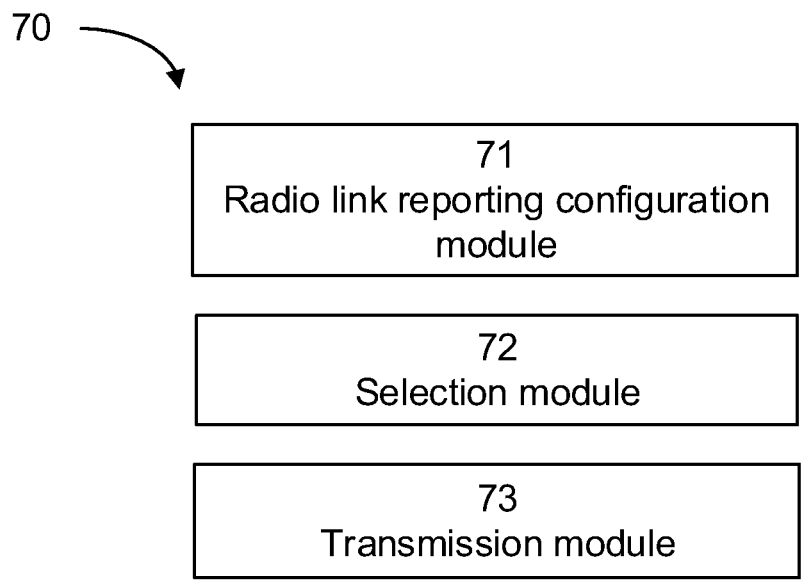
FIG. 7 illustrates an example node configuration for an access node.

FIG. 7 illustrates an embodiment of an access node 70 configured for configuring radio link measurement reporting in a wireless communication system supporting a plurality of radio link reporting mechanisms. The access node 70 comprises a radio link reporting configuration module 71 configured to obtain a plurality of radio link reporting configurations, each radio link reporting configuration specifying one or more of the supported radio link reporting mechanisms and wherein at least one of the plurality of radio link reporting configurations specifies a combination of a first and a second radio link reporting mechanism being mutually different. The access node also comprises a selection module 72 configured to select one radio link reporting configuration from the plurality of obtained configurations; and a transmission module 73 configured to transmit information about the selected radio link reporting configuration to a wireless device.

Figure 8:
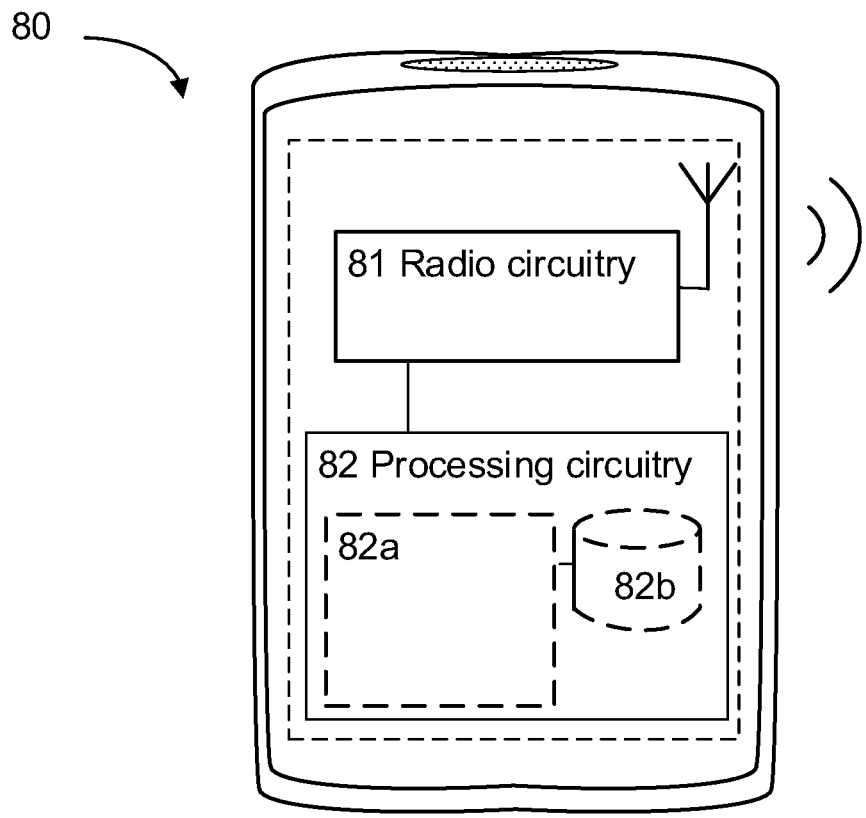
FIG. 8 illustrates an example wireless device configuration.

FIG. 8 is an example configuration of a wireless device 80, which may incorporate some of the example embodiments discussed above. The wireless device 80 is configured for configuring radio link measurement reporting in a wireless communication system supporting a plurality of radio link reporting mechanisms. As shown in FIG. 8, the wireless device comprises radio circuitry 51 arranged for transmission and reception of radio signals. It should be appreciated that the radio circuitry 51 may be comprised as any number of transceiving, receiving, and/or transmitting units or circuitry and that the radio circuitry may operate in half-duplex or full duplex transmission mode. It should further be appreciated that the radio circuitry 51 may be in the form of any input/output communications port known in the art.

The wireless device further comprises processing circuitry arranged to control operation of the wireless device. In particular, the processing circuitry 82 is configured to cause the wireless device to obtain a radio link reporting configuration comprising a radio link reporting mechanism, wherein the radio link reporting configuration specifies a combination of a first and a second radio link reporting mechanism being mutually different. The processing circuitry 82 is further configured to perform one or more mobility measurements for corresponding one or more candidate radio links; and transmit the one or more mobility measurements using the obtained radio link reporting configuration, wherein the mobility measurements are transmitted in a radio link measurement report to one or more access nodes associated with the reporting mechanism.

According to an aspect of the disclosure, the processing circuitry comprises a processor 52*a* and a memory 52*b*. The processor 52*a* may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit but may be provided as any number of units or circuitry.

The memory 52*b* may further be configured to store received or transmitted data and/or executable program instructions. The memory 53*b* may be any suitable type of computer readable memory and may be of volatile and/or non-volatile type.

Figure 9:
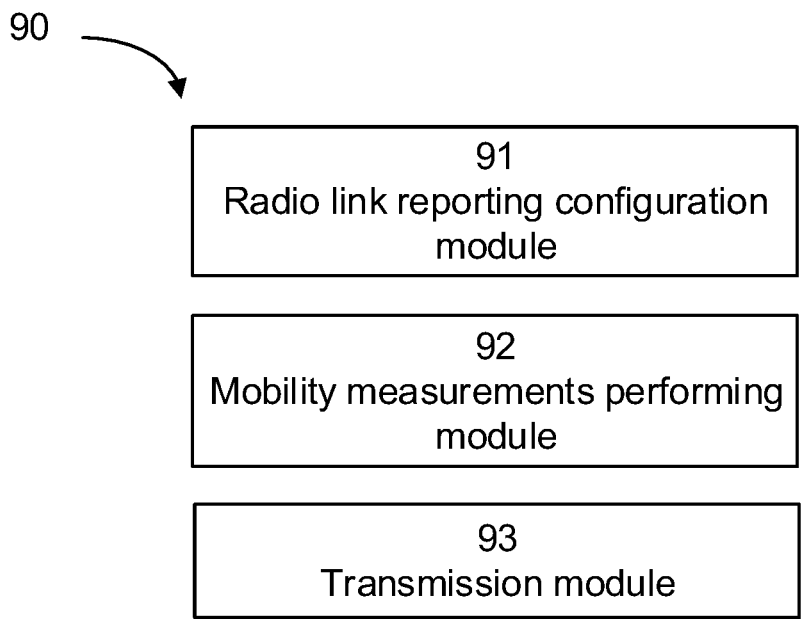
FIG. 9 illustrates an example wireless device configuration.

FIG. 9 illustrates an embodiment of a wireless device 90 configured for configuring radio link measurement reporting in a wireless communication system supporting a plurality of radio link reporting mechanisms. The wireless device a radio link reporting configuration module 91 configured to obtain a radio link reporting configuration comprising a radio link reporting mechanisms, wherein the radio link reporting configuration specifies a combination of a first and a second radio link reporting mechanism being mutually different; a mobility measurements performing module 92 for performing mobility measurements for corresponding one or more candidate radio links; and a transmission module 93 configured to transmit the one or more mobility measurements using the obtained radio link reporting configuration, wherein the mobility measurements are transmitted in a radio link measurement report to one or more access nodes associated with the reporting mechanism.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of source nodes, target nodes, corresponding methods, and computer program products. It should be appreciated that the example embodiments presented herein may be practiced in combination with each other.

The invention claimed is:

1. A method, for use in an access node, for configuring radio link measurement reporting in a wireless communication system supporting a plurality of radio link reporting mechanisms, the method comprising the access node:
   obtaining a plurality of radio link reporting configurations, each radio link reporting configuration specifying one or more of the supported radio link reporting mechanisms, wherein at least one of the plurality of radio link reporting configurations specifies a combination of both a first and a second radio link reporting mechanism with the first radio link reporting mechanism being different than the second radio link reporting mechanism, and wherein the first and second radio link reporting mechanisms use signaling on different protocol layers with the first radio link reporting mechanism being a physical layer radio link reporting mechanism using an uplink synchronization signal, and the second radio link reporting mechanism being an Radio Resource Control-based reporting mechanism;
   selecting one radio link reporting configuration from the plurality of obtained radio link reporting configurations; and
   transmitting information about the selected radio link reporting configuration to a wireless device.

2. The method of claim 1, wherein the first and second radio link reporting mechanisms have different reporting time cycle.

3. The method of claim 1, wherein the first and second radio link reporting mechanisms require different amount of radio resources.

4. The method of claim 1, wherein the selecting of one radio link reporting configuration is based on the frequency bands of the candidate links and/or the speed of the wireless device.

5. The method of claim 1, wherein each radio link reporting configuration is adapted to a reporting type; and wherein the reporting types comprise periodic reporting, on demand reporting, or event-triggered reporting.

6. The method of claim 1, wherein a radio link reporting configuration adapted to event triggered reporting is associated with a start trigger condition determining when to perform radio link measurements using the radio link reporting configuration.

7. The method of claim 6, wherein the radio link reporting configuration adapted to event triggered reporting is associated with a stop trigger condition determining when to cease radio link measurements using the radio link reporting configuration.

8. The method of claim 6, wherein the start trigger condition is configured for a mobility event.

9. The method of claim 8, wherein the transmitting of information about the selected radio link reporting configuration to a wireless device comprises transmitting information on the start trigger condition.

10. An access node configured for configuring radio link measurement reporting in a wireless communication system supporting a plurality of radio link reporting mechanisms, the access node comprising:
   radio circuitry arranged for transmission and reception of radio signals;
   communications circuitry for transmission and reception of inter node communications signals;
   processing circuitry configured to, using the radio circuitry, cause the access node to:
      obtain a plurality of radio link reporting configurations, each radio link reporting configuration specifying one or more of the supported radio link reporting mechanisms; wherein at least one of the plurality of radio link reporting configurations specifies a combination of both a first and a second radio link reporting mechanism with the first radio link reporting mechanism being different than the second radio link reporting mechanism, and wherein the first and second radio link reporting mechanisms use signaling on different protocol layers with the first radio link reporting mechanism being a physical layer radio link reporting mechanism using an uplink synchronization signal, and the second radio link reporting mechanism being an Radio Resource Control-based reporting mechanism;
      select one radio link reporting configuration from the plurality of obtained radio link reporting configurations; and transmit information about the selected radio link reporting configuration to a wireless device.

11. A method, for use in a wireless device, for configuring radio link measurement reporting in a wireless communication system supporting a plurality of radio link reporting mechanisms, the method comprising the wireless device:
obtaining a radio link reporting configuration comprising at least one radio link reporting mechanisms, wherein the radio link reporting configuration specifies a combination of both a first and a second radio link reporting mechanism with the first radio link reporting mechanism being different than the second radio link reporting mechanism, and wherein the first and second radio link reporting mechanisms use signaling on different protocol layers with the first radio link reporting mechanism being a physical layer radio link reporting mechanism using an uplink synchronization signal, and the second radio link reporting mechanism being an Radio Resource Control-based reporting mechanism;
performing one or more mobility measurements for corresponding one or more candidate radio links; and
transmitting the one or more mobility measurements using the obtained radio link reporting configuration, wherein the mobility measurements are transmitted in a radio link measurement report to one or more access nodes associated with the reporting mechanism.

12. The method of claim 11, wherein the performing one or more mobility measurements comprises measuring downlink mobility reference signals for corresponding candidate radio links.

13. The method of claim 12, wherein the performing one or more mobility measurements further comprises:
deriving downlink synchronization settings from downlink mobility reference signals; and
storing the derived downlink synchronization settings for the candidate radio links.

14. The method of claim 11, wherein each radio link reporting configuration is adapted to a reporting type; and wherein reporting types comprise periodic reporting, on demand reporting, or event-triggered reporting.

15. The method of claim 11, wherein a radio link reporting configuration adapted to event triggered reporting is associated with a start trigger condition determining when to perform radio link measurements using the radio link reporting configuration.

16. The method of claim 15, wherein the obtaining the radio link reporting configuration comprises obtaining information on the start trigger condition.

17. The method of claim 16, wherein the radio link reporting configuration and the start trigger condition is received in a configuration message from an access node.

18. A wireless device configured for configuring radio link measurement reporting in a wireless communication system supporting a plurality of radio link reporting mechanisms, the wireless device comprising:
radio circuitry arranged for transmission and reception of radio signals;
processing circuitry configured to, using the radio circuitry, cause the wireless device to:
obtain a radio link reporting configuration comprising at least one radio link reporting mechanisms, wherein the radio link reporting configuration specifies a combination of both a first and a second radio link reporting mechanism with the first radio link reporting mechanism being different than the second radio link reporting mechanism, and wherein the first and second radio link reporting mechanisms use signaling on different protocol layers with the first radio link reporting mechanism being a physical layer radio link reporting mechanism using an uplink synchronization signal, and the second radio link reporting mechanism being an Radio Resource Control-based reporting mechanism;
perform one or more mobility measurements for corresponding one or more candidate radio links; and
transmit the one or more mobility measurements using the obtained radio link reporting configuration, wherein the mobility measurements are transmitted in a radio link measurement report to one or more access nodes associated with the reporting mechanism.

* * * * *